US009065506B2

(12) United States Patent
Uejima

(10) Patent No.: US 9,065,506 B2
(45) Date of Patent: Jun. 23, 2015

(54) HIGH-FREQUENCY SWITCH MODULE

(71) Applicant: Murata Manufacturing Co., Ltd., Nagaokakyo-shi, Kyoto-fu (JP)

(72) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/951,616

(22) Filed: Jul. 26, 2013

(65) Prior Publication Data

US 2013/0309984 A1 Nov. 21, 2013

Related U.S. Application Data

(63) Continuation of application No. PCT/JP2012/054713, filed on Feb. 27, 2012.

(30) Foreign Application Priority Data

Mar. 4, 2011 (JP) ................................. 2011-047900

(51) Int. Cl.
*H04B 1/44* (2006.01)
*H04B 1/46* (2006.01)
*H04B 1/04* (2006.01)
*H04B 1/00* (2006.01)
(Continued)

(52) U.S. Cl.
CPC .............. *H04B 1/0475* (2013.01); *H04B 1/006* (2013.01); *H04B 1/525* (2013.01); *H04B 1/0458* (2013.01); *H04B 1/18* (2013.01)

(58) Field of Classification Search
CPC ............. H04B 1/48; H04B 1/44; G01S 7/034

USPC ...................................................... 455/78–83
See application file for complete search history.

(56) References Cited

U.S. PATENT DOCUMENTS 6,704,550 B1 * 3/2004 Kohama et al. ............ 455/114.2
7,050,769 B2 * 5/2006 Imai et al. .................. 455/114.3
7,206,551 B2 * 4/2007 Itakura et al. ................. 455/73
(Continued)

FOREIGN PATENT DOCUMENTS

CN 1503591 A 6/2004
CN 1947345 A 4/2007
(Continued)

OTHER PUBLICATIONS

Official Communication issued in International Patent Application No. PCT/JP2012/054713, mailed on Mar. 27, 2012.
(Continued)

*Primary Examiner* — Simon Nguyen
(74) *Attorney, Agent, or Firm* — Keating & Bennett, LLP

(57) ABSTRACT

A low pass filter connected between an individual port of a switch device and a high-frequency switch module attenuates the second harmonic and the third harmonic of a transmission signal input to a first transmission signal input terminal. Further, the inductances/capacitances of inductors and capacitors defining the low pass filter are set such that the phase of a harmonic signal generated by a power amplifier is different by 180° from the phase of a harmonic signal produced as a result of the low pass filter shifting the phase of a harmonic signal generated due to distortion in a switch device, in an end portion on the first transmission signal input terminal side.

16 Claims, 3 Drawing Sheets

(51) Int. Cl.
*H04B 1/525* (2015.01)
*H04B 1/18* (2006.01)

(56) References Cited

U.S. PATENT DOCUMENTS

| | | | |
|---|---|---|---|
| 7,221,207 B2* | 5/2007 | Fukumoto et al. | 327/365 |
| 7,515,882 B2* | 4/2009 | Kelcourse et al. | 455/78 |
| 7,522,887 B2* | 4/2009 | Nagano et al. | 455/78 |
| 7,596,357 B2* | 9/2009 | Nakamata et al. | 455/78 |
| 7,756,488 B2* | 7/2010 | Watanabe et al. | 455/78 |
| 7,839,234 B2* | 11/2010 | Prikhodko et al. | 333/103 |
| 8,183,908 B2* | 5/2012 | Kouki | 327/427 |
| 2004/0152426 A1 | 8/2004 | Suzuki et al. | |
| 2005/0032484 A1 | 2/2005 | Itakura et al. | |
| 2005/0287976 A1* | 12/2005 | Burgener et al. | 455/333 |
| 2006/0245382 A1* | 11/2006 | Hayashi | 370/297 |
| 2007/0123175 A1 | 5/2007 | Watanabe et al. | |
| 2008/0055187 A1* | 3/2008 | Tamura et al. | 343/876 |
| 2008/0136559 A1* | 6/2008 | Takahashi et al. | 333/167 |
| 2009/0295501 A1* | 12/2009 | Hayashi et al. | 333/132 |
| 2011/0096705 A1* | 4/2011 | Kemmochi et al. | 370/297 |

FOREIGN PATENT DOCUMENTS

| | | |
|---|---|---|
| JP | 2001-086026 A | 3/2001 |
| JP | 2004-173243 A | 6/2004 |
| JP | 2008-085775 A | 4/2008 |
| JP | 2010-273215 A | 12/2010 |
| WO | 2006/057173 A1 | 6/2006 |

OTHER PUBLICATIONS

Official Communication issued in corresponding Chinese Patent Application No. 201280011731.5, mailed on Jun. 25, 2014.
Official Communication issued in corresponding German Patent Application No. 11 2012 001 091.4, mailed on Sep. 18, 2014.

* cited by examiner

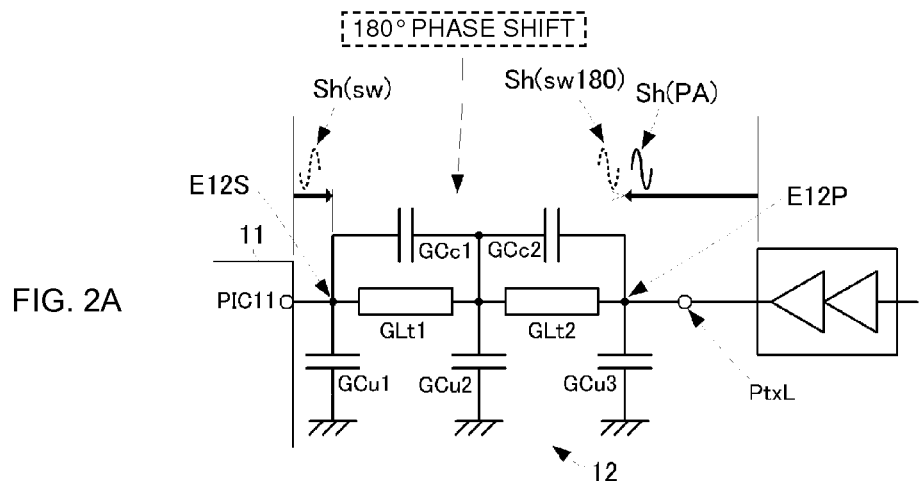
FIG. 2A
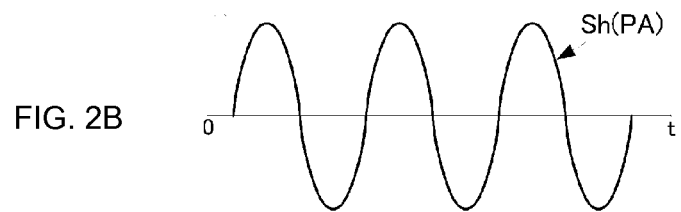
FIG. 2B
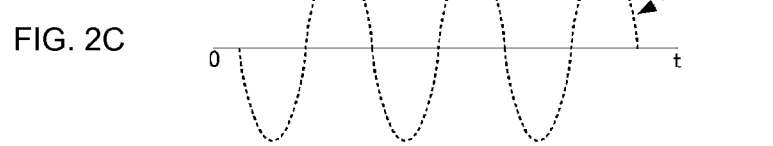
FIG. 2C
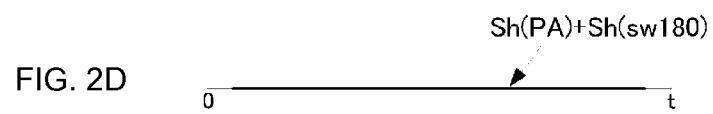
FIG. 2D
FIG. 3
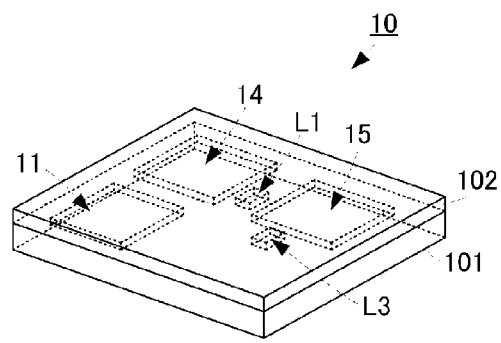

HIGH-FREQUENCY SWITCH MODULE

BACKGROUND OF THE INVENTION

1. Field of the Invention

The present invention relates to high-frequency switch modules in which a plurality of communication signals are transmitted and received using a common antenna.

2. Description of the Related Art

To date, various types of high-frequency switch modules have been devised in which a plurality of communication signals using different frequency bands are transmitted and received using a common antenna. In such high-frequency switch modules, a switch device made of a semiconductor, such as an FET, performs switching among communication signals or switching between a transmission signal and a reception signal of one type of communication signal.

In the case where such a switch device is used, when a high-power signal such as a transmission signal is input to the switch device, high-order harmonics, such as a second harmonic having a frequency twice the fundamental frequency and a third harmonic having a frequency three times the fundamental frequency may be generated due to distortion in the switch device. Such high-order harmonics generated in the switch device are output from all the terminals of the switch device to the outside. There may be a case in which high-order harmonics output to a transmission signal input circuit side are reflected by a filter connected to the transmission signal input circuit side of the switch device, transmitted again through the switch device, and radiated from an antenna.

Hence, in Japanese Unexamined Patent Application Publication No. 2004-173243, a phase shifting unit is connected between a switch device and a low pass filter of a transmission signal input circuit. With this configuration, by making a harmonic signal reflected by the low pass filter and output to an antenna side through a switch IC and a harmonic signal directly output to the antenna from the switch device have a phase difference of 180°, these harmonic signals cancel each other out.

However, with the configuration illustrated in Japanese Unexamined Patent Application Publication No. 2004-173243, a phase shifting unit needs to be provided between the switch device and the low pass filter and, hence, the number of constituent components of the high-frequency switch module is increased, resulting in an increase in size. Further, since a phase shift applied by the phase shifting unit is determined by the length of an electrode forming the phase shifting unit, a high precision electrode pattern needs to be formed. On the other hand, when the precision with which the electrode pattern is formed is low, the effect of attenuating a harmonic signal is significantly reduced.

SUMMARY OF THE INVENTION

Accordingly, preferred embodiments of the present invention provide a high-frequency switch module that more reliably attenuates harmonic signals radiated from an antenna without using an additional constituent component to attenuate harmonic signals.

According to a preferred embodiment of the present invention, a high-frequency switch module includes a switch device and a filter circuit. The switch device switches between a first individual port that is connected to a transmission signal input terminal of the high-frequency switch module and a second individual port that is connected to a reception output terminal of the high-frequency switch module so that either the first individual port or the second individual port is connected to a common port that is connected to an antenna connection terminal of the high-frequency switch module. The filter circuit includes an inductor connected in series between the transmission signal input terminal and the first individual port and that attenuates a harmonic signal of a transmission signal. Further, the filter circuit is configured in such a manner that a phase of a distortion harmonic signal generated due to distortion in the switch device is different by 180° from a phase of the harmonic signal of the transmission signal at an end of the filter circuit nearer to the transmission signal input terminal.

With this configuration, since the harmonic signal of a transmission signal input from a power amplifier (PA) provided in a stage prior to the transmission signal input terminal has the same frequency as the distortion harmonic signal generated due to distortion in the switch device, these harmonic signals cancel each other out as a result of having a phase difference of 180° at an end of the filter circuit nearer to the transmission signal input terminal. Note that at this time, even when the distortion harmonic signal and the harmonic signal of the transmission signal do not completely cancel each other out, since the filter circuit has characteristics that attenuate the harmonic signal, the harmonic signal transmitted from the end of the filter circuit nearer to the transmission signal input terminal is reliably attenuated.

In the high-frequency switch module according to a preferred embodiment of the present invention, it is preferable that an electrical length of the filter circuit from an end of the filter circuit nearer to the first individual port to the end of the filter circuit nearer to the transmission signal input terminal be ½ of a wavelength of the harmonic signal and the distortion harmonic signal.

With configuration, by making the electrical length of the filter circuit equal to ½ of a wavelength of the harmonic signal and the distortion harmonic signal, the phase relationship described above is realized.

It is preferable that the high-frequency switch module according to a preferred embodiment of the present invention have the following configuration. The inductor includes a first inductor and a second inductor connected in series between the transmission signal input terminal and the first individual port. The filter circuit includes a first low pass filter including the first inductor and a second low pass filter including the second inductor. In this configuration, the electrical length from the end of the filter circuit nearer to the first individual port to the end of the filter circuit nearer to the transmission signal input terminal is ½ of a wavelength of a second-harmonic signal in the harmonic signal and the distortion harmonic signal. The filter circuit is configured in such a manner that a phase of a third-harmonic signal in the harmonic signal is different by 180° from a phase of a third-harmonic signal in the distortion harmonic signal at a connection node between the first low pass filter and the second low pass filter.

With this configuration, the second-harmonic signals cancel each other out at the end of the filter circuit nearer to the transmission signal input terminal and the third-harmonic signals cancel each other out at a predetermined position in the filter. As a result, among a plurality of high-order harmonic signals, in addition to the second-harmonic signal having the highest level, the third-harmonic signal having a level next to the highest level can be attenuated.

In the high-frequency switch module according to a preferred embodiment of the present invention, it is preferable that the filter circuit include a capacitor, one end of which is connected to at least one end of the inductor, and the other end of which is connected to ground.

With this configuration, without changing the inductance of the inductor, the amount of phase shift is significantly increased. In other words, this configuration enables a reduction in the length of a line electrode (substantial length of the electrode along a signal transmission path) defining an inductor connected in series with a signal line to cause a phase shift of 180° to be generated in the harmonic signal. As a result, the loss of the inductor is significantly reduced or prevented and the Q factor of the filter is significantly improved. Further, by adding this capacitor, the attenuation characteristics of the filter circuit can be adjusted and improved.

It is preferable that the high-frequency switch module according to a preferred embodiment of the present invention have the following configuration. The high-frequency switch module includes a mounting-type FET switch realizing the switch device and a multilayer body including a plurality of dielectric layers stacked on each other. The multilayer body includes an inner layer pattern defining the inductor and the FET switch mounted thereon. The inner layer pattern forming the inductor is arranged so as to be sandwiched between two inner layer ground electrodes respectively located on different dielectric layers, in a stacking direction.

With this configuration, electromagnetic interference on the inductor from the outside is significantly reduced or prevented.

In the high-frequency switch module according to a preferred embodiment of the present invention, it is preferable that the inductor have a helical shape or a spiral shape, for example.

With this configuration, line electrodes defining the inductor are magnetically coupled to one another and, hence, shorter electrodes can be used to obtain a phase shift of 180°. As a result, the loss of the inductor is significantly reduced and the Q factor of the filter is improved.

According to various preferred embodiments of the present invention, without providing an additional circuit such as a phase shifting unit of the existing technology, a distortion harmonic signal which is generated in the switching device and transmitted to the transmission circuit side can be attenuated and the distortion harmonic signal is prevented from returning to the switch device and being radiated from the antenna.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A-2D are diagrams illustrating the concept of attenuating distortion harmonic signals according to a preferred embodiment of the present invention, i.e., the operation of a preferred embodiment of the present invention.

FIG. 3 is an external perspective view of the high-frequency switch module 10.

DETAILED DESCRIPTION OF THE PREFERRED EMBODIMENTS

Figure 1:
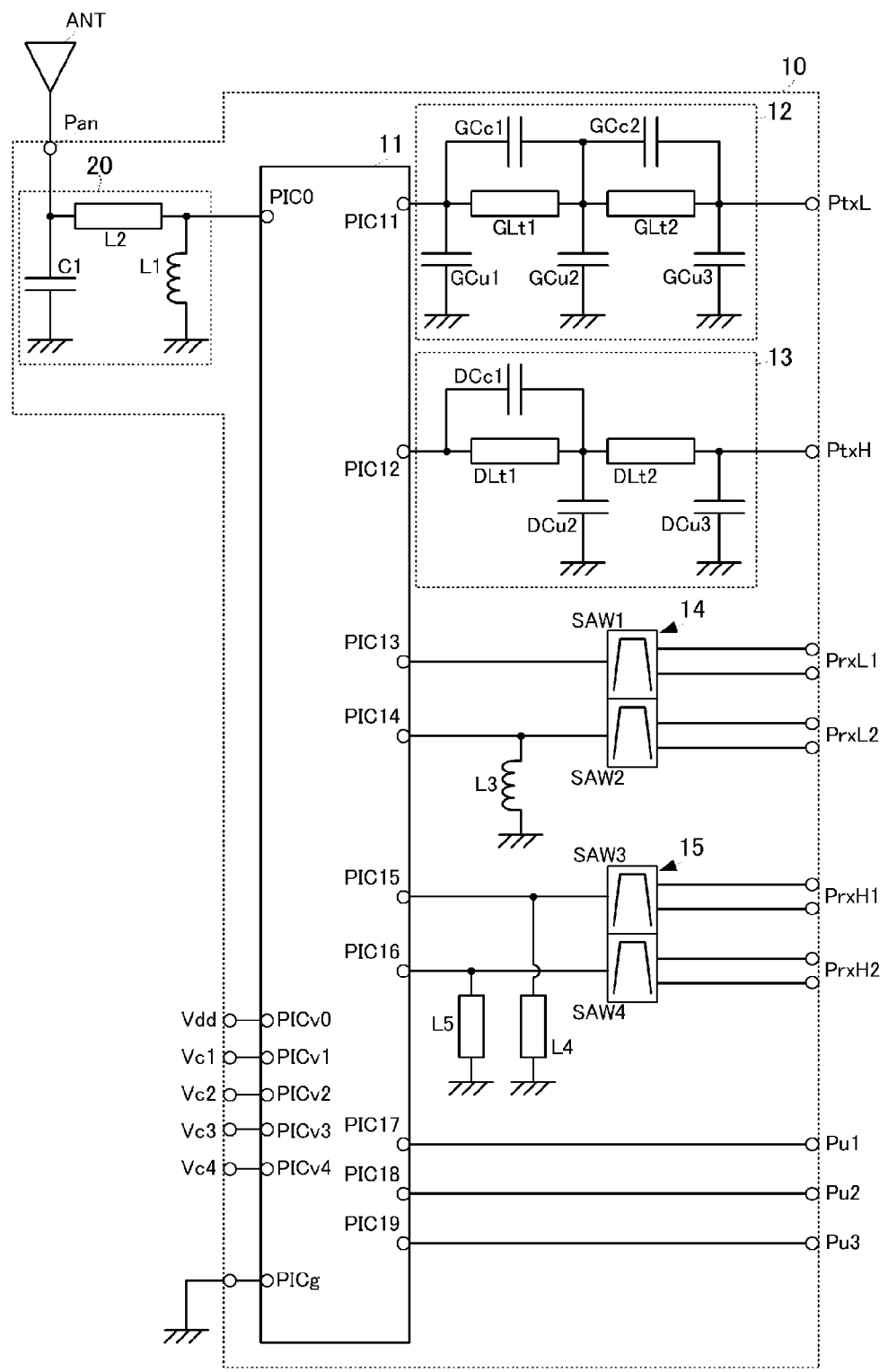
FIG. 1 is a circuit diagram of a high-frequency switch module 10 according to a preferred embodiment of the present invention.

A high-frequency switch module 10 according to a preferred embodiment of the present invention will be described with reference to the drawings. FIG. 1 is a circuit diagram of the high-frequency switch module 10 according to the present preferred embodiment.

The high-frequency switch module 10 includes a switch device 11, a low pass filters 12 and 13, SAW duplexers 14 and 15, and an antenna side matching circuit 20.

The switch device 11 includes a semiconductor switch, such as an FET switch. The switch device 11 includes a single common port PIC0, nine individual ports PIC11 to PIC19, a power supply input port PICv0, four control signal input ports PICv1 to PICv4, and a ground connection port PICg.

The ground connection port PICg is connected to the ground. A DC drive voltage to operate the switch device 11 is applied to the power supply input port PICv0. Control signals having either the Hi level or the Low level are respectively applied to the control signal input ports PICv1 to PICv4.

The switch device 11 operates with a DC drive voltage, and connects the common port PIC0 to one of the individual ports PIC11 to PIC19 through switching in accordance with the combinations of the Hi and Low levels of the four control signals.

An antenna connection terminal Pan of the high-frequency switch module 10 is connected to the common port PIC0, through the antenna side matching circuit 20. The antenna connection terminal Pan is connected to an antenna ANT.

The antenna side matching circuit 20 includes an inductor L2 connected in series between the common port PIC0 and the antenna connection terminal Pan. An end portion of the inductor L2 on the antenna connection terminal Pan side is connected to the ground through a capacitor C1. An end portion of the inductor L2 on the common port PIC0 side is connected to the ground through an inductor L1. The antenna side matching circuit 20 performs impedance matching between the switch device 11 and the antenna ANT and also functions as an ESD circuit to protect the switch device 11 and circuits connected to the individual port side of the switch device 11 when static electricity is in input from the antenna ANT.

A first transmission signal input terminal PtxL of the high-frequency switch module 10 is connected to the individual port PIC11 through the low pass filter 12 corresponding to the filter circuit according to a preferred embodiment of the present invention. The first transmission signal input terminal PtxL is connected to a power amplifier PA in a prior stage in the transmission system for a transmission signal.

The low pass filter 12 includes an inductor GLt1 and an inductor Glt2 connected in series between the individual port PIC11 and the first transmission signal input terminal PtxL. A capacitor GCc1 is connected in parallel with the inductor GLt1. An end portion of the inductor GLt1 on the individual port PIC11 side is connected to the ground through a capacitor GCu1.

A connection node between the inductor GLt1 and the inductor Glt2 is connected to the ground through a capacitor GCu2. A capacitor GCc2 is connected in parallel with the inductor Glt2. An end portion of the inductor Glt2 on the first transmission signal input terminal PtxL side is connected to the ground through a capacitor GCu3.

The low pass filter 12 is a filter with an attenuation band including the second-harmonic frequency and the third harmonic frequency of a transmission signal (for example, a GSM850 transmission signal or a GSM 900 transmission signal) input from the first transmission signal input terminal PtxL and a passband including the fundamental frequency of the transmission signal. More specifically, by appropriately setting the inductance of the inductor GLt1 and the capacitances of the capacitors GCc1, GCu1, and GCu2, a first low pass filter is provided in which the second-harmonic frequency of a transmission signal is the attenuation pole and the fundamental frequency of the transmission signal is included in the passband. By appropriately setting the inductance of the inductor GLt2 and the capacitances of the capacitors GCc2, GCu3, and GCu2, a second low pass filter is provided in which the third harmonic frequency of the transmission signal is the attenuation pole and the fundamental frequency of the transmission signal is included in the passband.

In the low pass filter 12, whose specific concept and operation will be described later, the capacitances or inductances of the components are set in such a manner that a distortion harmonic signal having the same frequency as the second harmonic of a transmission signal input from the individual port PIC11 side reaches the first transmission signal input terminal PtxL side end portion in a state of having a phase difference of 180° with respect to the second-harmonic signal input from the first transmission signal input terminal PtxL. As a result, the second-harmonic signal of a transmission signal and a distortion harmonic signal cancel each other out in the first transmission signal input terminal PtxL side end portion of the low pass filter 12.

The low pass filter 13 includes an inductor DLt1 and an inductor DLt2 connected in series between the individual port PIC12 and a second transmission signal input terminal Ptxh. A capacitor DCc1 is connected in parallel with the inductor DLt1.

A connection node between the inductor DLt1 and the inductor DLt2 is connected to the ground through a capacitor DCu2. An end portion of the inductor DLt2 on the second transmission signal input terminal Ptxh side is connected to the ground through a capacitor DCu3.

The low pass filter 13 has an attenuation band including the frequency of the second harmonic of a transmission signal (for example, a GSM1800 transmission signal or a GSM1900 transmission signal) input from the second transmission signal input terminal Ptxh, and a passband including the fundamental frequency of the transmission signal. More specifically, by appropriately setting the inductance of the inductor DLt1 and the capacitances of the capacitor DCc1 and the capacitor DCu2, a third low pass filter is provided that has an attenuation pole at the frequency of the second harmonic of a transmission signal and a passband including the fundamental frequency of the transmission signal. By appropriately setting the inductance of the inductor DLt2 and the capacitances of the capacitor DCu3 and the capacitor DCu2, a fourth low pass filter is provided that has an attenuation band including the third harmonic frequency of a transmission signal. Note that in the present preferred embodiment, the first low pass filter and the third low pass filter correspond to the first low pass filter, and the second low pass filter and the fourth low pass filter correspond to the second low pass filter.

The unbalanced terminal of a SAW filter SAW1 of the SAW duplexer 14 is connected to the individual port PIC13. The SAW filter SAW1 has an unbalanced-balanced conversion function and the balanced terminals are connected to first reception signal output terminals PrxL1 of the high-frequency switch module 10. The SAW filter SAW1 is a filter having a passband that is the frequency band of a first reception signal (for example, GSM850 reception signal).

The unbalanced terminal of a SAW filter SAW2 of the SAW duplexer 14 is connected to the individual port PIC14. The SAW filter SAW2 has an unbalanced-balanced conversion function, and the balanced terminals are connected to second reception signal output terminals PrxL2 of the high-frequency switch module 10. The SAW filter SAW2 is a filter having a passband which is the frequency band of a second reception signal (for example, GSM900 reception signal).

The unbalanced terminal of a SAW filter SAW3 of the SAW duplexer 15 is connected to the individual port PIC15. The SAW filter SAW3 has an unbalanced-balanced conversion function, and the balanced terminals are connected to third reception signal output terminals PrxH1 of the high-frequency switch module 10. The SAW filter SAW3 is a filter having a passband which is the frequency band of a third reception signal (for example, GSM1800 reception signal).

The unbalanced terminal of a SAW filter SAW4 of the SAW duplexer 15 is connected to the individual port PIC16. The SAW filter SAW4 has an unbalanced-balanced conversion function, and the balanced terminals are connected to fourth reception signal output terminals PrxH2 of the high-frequency switch module 10. The SAW filter SAW4 is a filter having a passband which is the frequency band of a fourth reception signal (for example, GSM1900 reception signal).

A first transmission/reception common terminal Pu1 of the high-frequency switch module 10 is connected to the individual port PIC17. A second transmission/reception common terminal Pu2 of the high-frequency switch module 10 is connected to the individual port PIC18. A third transmission/reception common terminal Pu3 of the high-frequency switch module 10 is connected to the individual port PIC19. Note that these transmission/reception common terminals Pu1, Pu2, and Pu3 and the individual ports PIC17, PIC18, and PIC19 may be omitted. Further, the individual ports PIC12, PIC15, and PIC16 and the circuits connected to these ports may also be omitted.

When a high-power transmission signal is input to the high-frequency switch module 10 with this configuration from the first transmission signal input terminal PtxL, the characteristics of the switch device 11 are distorted by the fundamental frequency component of the transmission signal, and harmonic signals whose frequencies are integer multiples of the fundamental frequency are generated and output from the ports of the switch device 11. In particular, the second-harmonic signal whose frequency is twice the fundamental frequency has high power. Hence, hereinafter, a configuration that reduces the second-harmonic signal will be described. Note that attenuation of distortion harmonic signals using such a configuration can be achieved for any harmonic signal.

Here, at the time of input of a transmission signal, since the common port PIC0 is connected to the individual port PIC11 to which a transmission signal is input, when distortion harmonic signals which are generated in the switch device 11 and output from the individual port PIC11 are reflected in the switch device 11 side end portion of the low pass filter 12 and return to the switch device 11, the distortion harmonic signals also propagate to the antenna ANT. However, such distortion harmonic signals returning to the switch device 11 are attenuated by the configuration of the present application.

FIGS. 2A-2D are diagrams illustrating the concept of attenuating distortion harmonic signals according to a preferred embodiment of the present invention, i.e., the operation of a preferred embodiment of the present invention. FIG. 2A is a diagram illustrating the phase states and the like of harmonic signals in the transmission lines near the low pass filter 12. FIG. 2B is a diagram illustrating the waveform of a harmonic signal Sh(PA) in the first transmission signal input terminal PtxL side end portion of the low pass filter 12, and FIG. 2C is a diagram illustrating the waveform of a harmonic signal Sh(sw180) in the first transmission signal input terminal PtxL side end portion of the low pass filter 12. FIG. 2D is a diagram illustrating the waveform of a combined signal of the harmonic signal Sh(PA) and harmonic signal Sh(sw180) of a transmission signal in the first transmission signal input terminal PtxL side end portion of the low pass filter 12.

A transmission signal is input to the low pass filter 12 from a first transmission signal input terminal PtxL side end portion E12P. At this time, the harmonic signal Sh(PA) generated due to amplification processing of the power amplifier (PA) is input together with a fundamental-frequency signal from the first transmission signal input terminal PtxL side end portion E12P.

On the other hand, as described above, a distortion harmonic signal Sh(sw) having the same frequency as the second harmonic of a transmission signal is input to the low pass filter 12 from an individual port PIC11 side end portion E12S of the switch device 11.

Here, the high-frequency switch module 10 is configured in such a manner that the electrical length of the low pass filter 12 and the electrical length of a transmission line connecting the switch device side end portion E12S of the low pass filter 12 to the individual port PIC11 of the switch device 11, for the fundamental frequency transmission signal, are very short compared with the wavelength of the fundamental frequency signal. Here, an electrical length is a length between a specific point (first point) and another specific point (second point) of a high-frequency circuit represented in terms of the amount of phase shift of a high frequency signal, rather than a physical length.

With this configuration, the phase of the distortion harmonic signal Sh(sw) output from the individual port PIC11 becomes substantially the same as the phase of the harmonic signal Sh(PA) input to the first transmission signal input terminal PtxL side end portion E12P of the low pass filter 12.

Further, when the high-frequency switch module 10 is configured in such a manner that the electrical length of a transmission line connecting the switch device side end portion E12S of the low pass filter 12 to the individual port PIC11 of the switch device 11 becomes very short compared with the wavelength of the second-harmonic signal, the distortion harmonic signal Sh(sw) is input to the switch device side end portion E12S of the low pass filter 12 almost without undergoing phase shift.

Here, the inductances of the inductors GLt1 and Glt2 and the capacitances of the capacitors GCu1, Gcu2, and Gcu3 are adjusted in such a manner that the phase of the distortion harmonic signal Sh(sw) is changed by 180°. This adjustment, as described later, can be made by, for example, forming the high-frequency switch module 10 as a multilayer body and appropriately adjusting the shapes and positional relationships of inner layer line electrodes and plate electrodes.

In this manner, the distortion harmonic signal Sh(sw) in the switch device side end portion E12S is shifted in phase by 180° through passing through the low pass filter 12 and appears in the first transmission signal input terminal PtxL side end portion E12P as a phase-inverted distortion harmonic signal Sh(sw180).

As a result, in the first transmission signal input terminal PtxL side end portion E12P of the low pass filter 12, when the harmonic signal Sh(PA) from PA has the waveform as illustrated in FIG. 2B, the phase-inverted distortion harmonic signal Sh(sw180) has a waveform whose phase has been inverted with respect to that of the harmonic signal Sh(PA), as illustrated in FIG. 2C. Hence, the harmonic signal Sh(PA) and the phase-inverted distortion harmonic signal Sh(sw180) cancel each other out, resulting in a state where there are almost no harmonic signals, as illustrated in FIG. 2D.

As described above, by using the configuration of the present preferred embodiment, distortion harmonic signals output from the switch device 11 to the transmission circuit side is significantly attenuated. As a result, distortion harmonic signals that return to the switch device 11 and are transmitted to the antenna ANT is significantly attenuated. At this time, since no additional circuits only for attenuating distortion harmonic signals are required, a high-frequency switch module which is smaller than existing switch modules and has a minimum required configuration is realized.

The above descriptions described the case in which the phases of the harmonic signal Sh(PA) and the phase-inverted distortion harmonic signal Sh(sw180) preferably are exactly opposite and cancel each other out. However, since the grounded low pass filter 12 which attenuates harmonic signals is provided on the switch device 11 side (antenna ANT side) of the first transmission signal input terminal PtxL side end portion E12P, even when the difference between these phases of the harmonic signals deviates from 180° to some extent, a sufficient attenuation effect is achieved.

In the descriptions above, the electrical length of a transmission line between the individual port PIC11 side end portion E12S of the low pass filter 12 and the individual port PIC11 is preferably set to a length that is very small compared with the wavelength of the second-harmonic signal. However, the capacitances and inductances of the circuit components of the low pass filter 12 may be set in such a manner that the phase of a harmonic signal is shifted by 180° between the individual port PIC11 of the switch device 11 and the first transmission signal input terminal PtxL side end portion E12P of the low pass filter 12, considering also the electrical length of the transmission line.

Although the above descriptions describe the case in which capacitors that connect the end portions of the inductors GLt1 and GLt2 to the ground are used as shunts, these capacitors may be omitted. In this case, the phase of a harmonic signal may be shifted by 180° by adjusting the inductances through, for example, adjustment of the lengths of the electrodes forming the inductors GLt1 and GLt2. However, by using these shunt capacitors, the capacitors can be made to have phase shifting effects, such that the inductors GLt1 and GLt2 can have short lengths. As a result, the transmission loss of the low pass filter 12 is significantly reduced and also the Q factor of the filter is greatly improved. Further, by the use of the shunt capacitors, adjustment of the attenuation pole becomes possible, whereby it becomes easy to realize a low pass filter having desired attenuation characteristics.

Figure 4:
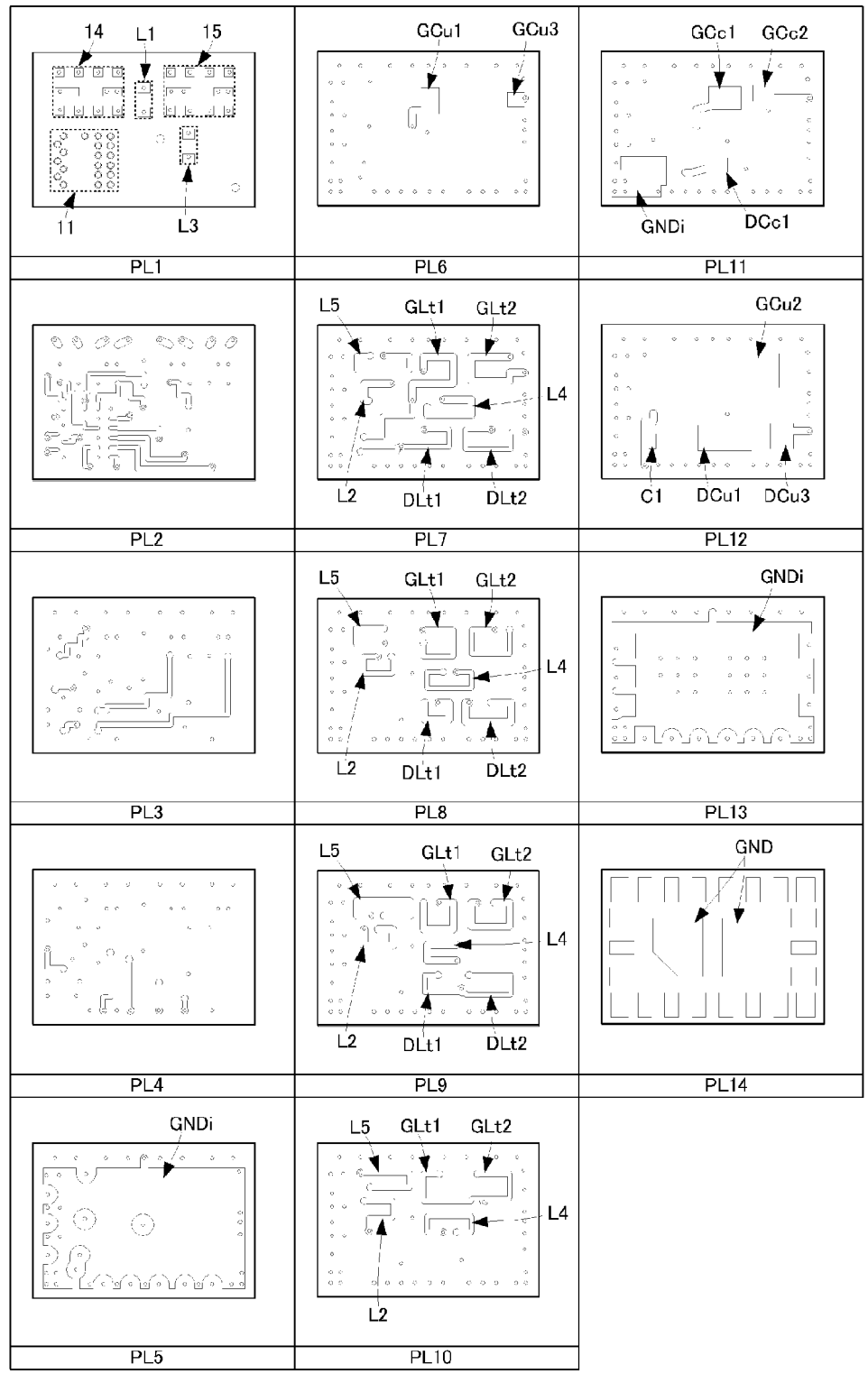
FIG. 4 is a stacking diagram of the high-frequency switch module 10.

The high-frequency switch module 10 having the circuit configuration described above can be realized using a multilayer body as illustrated below. FIG. 3 is an external perspective view of the high-frequency switch module 10. FIG. 4 is a stacking diagram of the high-frequency switch module 10.

The high-frequency switch module 10 includes a multilayer body 101 including a plurality of dielectric layers stacked on each other. Referring to FIG. 4, the dielectric layers of the multilayer body 101 have predetermined electrode patterns located thereon, and electrode patterns on different dielectric layers are electrically connected to one another using conductive via holes illustrated as circles in FIG. 4.

The multilayer body 101 preferably has a rectangular or substantially rectangular shape, and mounting-type FET switches that define the switch device 11 and mounting-type devices that define the SAW duplexers 14, 15 are mounted on predetermined positions of the top surface of the multilayer body 101. Chip inductor devices that define the inductors L1 and L3 are also mounted on the top surface of the multilayer body 101.

A protection layer 102 made of an insulating resin is arranged on the top surface of the multilayer body 101 in such a manner as to cover these mounting-type devices.

Dielectric layers PL1 and PL2 are stacked in this order from the uppermost layer of the multilayer body 101, and the lowermost layer is a dielectric layer PL14. Land electrode patterns that mount the mounting-type devices described above are located on the upper surface of the dielectric layer PL1. Line electrodes for routing are located on the dielectric layer PL2 and dielectric layers PL3 and PL4.

An inner layer ground electrode GNDi is arranged over substantially the whole surface of a dielectric layer PL5. Plate electrodes that define the capacitors GCu1 and GCu3 are located on a dielectric layer PL6.

Line electrodes that define the inductors GLt1, GLt2, DLt1, DLt2, L2, L4, and L5 are located on dielectric layers PL7, PL8, PL9, and PL10.

The inductors GLt1, GLt2, L2, L4, and L5 are helical coils continuously arranged on the dielectric layers PL7, PL8, PL9, and PL10 with axes extending in the stacking direction. The inductors DLt1 and DLt2 are helical coils continuously arranged on the dielectric layers PL7, PL8, and PL9 with axes extending in the stacking direction. By providing the inductors in helical shapes in this manner, in each of the inductors, line electrodes defining the inductor are magnetically coupled to one another and, hence, shorter electrodes can be used than in the case of shapes where the line electrodes are not magnetically coupled to one another, to obtain the same amount of phase shift. As a result, the inductors and also the multilayer body 101 can be reduced in size. Note that although the examples of helical shapes are shown in the present preferred embodiment, the inductors may have spiral shapes.

Plate electrodes that define the capacitors GCc1, GCc2, and DCc1 are located on a dielectric layer PL11. An inner layer ground electrode GNDi is also located on the dielectric layer PL11. Plate electrodes that define the capacitors GCu2, DCu1, DCu3, and C1 are located on a dielectric layer PL12.

An inner layer ground electrode GNDi is arranged over substantially the whole surface of a dielectric layer PL13. The dielectric layer PL14 is a layer corresponding to the bottom portion of the multilayer body 101. External connection electrodes that connect the high-frequency switch module 10 (multilayer body 101) to an external circuit are located in an array on the bottom surface of the dielectric layer PL14.

By forming the multilayer body 101 in this manner, the dielectric layers on which the line electrodes of the inductors GLt1, GLt2, DLt1, DLt2, L2, L4, and L5 are provided are sandwiched between the dielectric layers on which the inner layer ground electrodes GNDi are arranged over substantially the whole surfaces. Hence, the influence of an external electromagnetic field on the line electrodes of the inductors GLt1, GLt2, DLt1, DLt2, L2, L4, and L5 is significantly reduced or prevented. As a result, a more accurate phase shifting operation can be realized.

In addition, by providing the dielectric layers in such a manner that the dielectric layer include capacitors thereon, the dielectric layers including inductors located thereon, and the dielectric layers including capacitors located thereon are arranged in this order between the dielectric layers including the inner layer ground electrodes GNDi arranged substantially over the whole surfaces thereof, propagation of electromagnetic fields generated by the inductors is significantly reduced or prevented by the capacitor electrodes, such that the influence of an external electromagnetic field described above on the inductors is further decreased. Further, by providing the capacitors and inductors with many connection nodes in the circuit on dielectric layers close to each other, the lengths of routing lines are decreased and generation of parasitic components is significantly reduced or prevented, such that the characteristics are improved and the design of the electrode patterns is facilitated.

It should be noted that although the above descriptions describe an example in which the second-harmonic signals cancel each other out in the first transmission signal input terminal PtxL side end portion E12P of the low pass filter 12, it is possible to make the phase of a third-harmonic signal generated by a power amplifier different by 180° from the phase of a third-harmonic signal generated due to distortion in the switch device 11, for example, at the connection node between the inductor GLt1 and the inductor Glt2 of the low pass filter 12, by further adjusting the inductances of the inductors GLt1 and GLt2 and the capacitances of the capacitors GCu1, GCu2, and GCu3 defining the low pass filter 12. With this configuration, a high-frequency switch module that cancels out two kinds of high-order harmonic signals (a second-harmonic signal and a third-harmonic signal) generated by the switch device 11 at the same time is realized. At this time, regarding third-harmonic signals, since the third-harmonic signal generated by the power amplifier has been attenuated to some extent by the low pass filter on the first transmission signal input terminal PtxL side of the low pass filter 12, a sufficient effect is obtained even when a difference in phase from the third-harmonic signal due to distortion is shifted from 180° to some extent, unless the difference becomes 0°.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency switch module comprising:
a switch device that switches between a first individual port that is connected to a transmission signal input terminal of the high-frequency switch module and a second individual port that is connected to a reception output terminal of the high-frequency switch module so that either the first individual port or the second individual port is connected to a common port that is connected to an antenna connection terminal of the high-frequency switch module; and
a filter circuit that includes an inductor and a capacitor, that is connected in series between the transmission signal input terminal and the first individual port, and that attenuates a harmonic signal of a transmission signal; wherein
the inductor is defined by a coil;
in the filter circuit, at least one of an inductance of the inductor and a capacitance of the capacitor is set such that a phase of a distortion harmonic signal which is generated due to distortion in the switch device and which is transmitted from the switch module to a side of the filter circuit at which the switch device is positioned is different by 180° from a phase of the harmonic signal of the transmission signal at an end of the filter circuit nearer to the transmission signal input terminal, and the distortion harmonic signal and the harmonic signal of the transmission signal cancel each other.

2. The high-frequency switch module according to claim 1, wherein an electrical length of the filter circuit from an end of the filter circuit nearer to the first individual port to an end of the filter circuit nearer to the transmission signal input terminal is ½ of a wavelength of the harmonic signal and the distortion harmonic signal.

3. The high-frequency switch module according to claim 2, wherein
the inductor includes a first inductor and a second inductor connected in series between the transmission signal input terminal and the first individual port;
the filter circuit includes a first low pass filter including the first inductor and a second low pass filter including the second inductor;
the electrical length from the end of the filter circuit nearer to the first individual port to the end of the filter circuit nearer to the transmission signal input terminal is ½ of a wavelength of a second-harmonic signal in the harmonic signal and the distortion harmonic signal; and
the filter circuit is configured such that a phase of a third-harmonic signal in the harmonic signal is different by 180° from a phase of a third-harmonic signal in the distortion harmonic signal at a connection node between the first low pass filter and the second low pass filter.

4. The high-frequency switch module according to claim 3, wherein the first low pass filter is arranged such that an attenuation pole is the second-harmonic frequency of the transmission signal and a passband including a fundamental frequency of the transmission signal.

5. The high-frequency switch module according to claim 3, wherein the second low pass filter has an attenuation band including the frequency of the second harmonic of the transmission signal and a passband including a fundamental frequency of the transmission signal.

6. The high-frequency switch module according to claim 3, wherein the first low pass filter includes two low pass filters and the second low pass filter includes two low pass filters.

7. The high-frequency switch module according to claim 1, wherein one end of the capacitor is connected to at least one end of the inductor, and another end of the capacitor is connected to ground.

8. The high-frequency switch module according to claim 1, further comprising:
a mounting-type FET switch defining the switch device; and
a multilayer body including a plurality of dielectric layers stacked on each other, the multilayer body including an inner layer pattern that defines the inductor and including the FET switch mounted thereon; wherein
the inner layer pattern of the inductor is sandwiched between two inner layer ground electrodes respectively located on different dielectric layers, in a stacking direction.

9. The high-frequency switch module according to claim 8, further comprising an insulating resin protection layer arranged on a top surface of the multilayer body to cover the FET switch.

10. The high-frequency switch module according to claim 8, wherein the two the inner layer ground electrodes are each arranged over substantially an entire surface of respective ones of the different dielectric layers.

11. The high-frequency switch module according to claim 8, further comprising plate electrodes on difference dielectric layers of the multilayer body to define capacitors.

12. The high-frequency switch module according to claim 1, wherein the inductor has a helical shape or a spiral shape.

13. The high-frequency switch module according to claim 1, further comprising SAW duplexers and an antenna side matching circuit.

14. The high-frequency switch module according to claim 13, wherein the antenna side matching circuit is arranged to perform impedance matching between the switch device and an antenna and defines an ESD circuit that protects the switch device from static electricity input from the antenna.

15. The high-frequency switch module according to claim 1, wherein the filter circuit is configured such that second-harmonic signals in the harmonic signal cancel each other out in a first transmission signal input terminal side end portion of the first low pass filter.

16. The high-frequency switch module according to claim 1, wherein the filter circuit is configured such that a phase of a third-harmonic signal generated by a power amplifier is different by 180° from a phase of a third-harmonic signal generated due to distortion in the switch device.

* * * * *